Patented July 31, 1951

2,562,314

UNITED STATES PATENT OFFICE 2,562,314

PROCESS FOR PRODUCING A 1,4,5,8-TETRA-AMINOANTHRAQUINONE DYESTUFF

Clarence E. Hieserman, Cumberland, Md., assignor to Celanese Corporation of America, a corporation of Delaware No Drawing. Application May 25, 1948,
Serial No. 29,191

8 Claims. (Cl. 260—378)

This invention relates to the preparation of dyestuffs and relates more particularly to an improved process for the production of a novel anthraquinone dyestuff.

As is well known the dyestuff 1:4:5:8-tetra-amino-anthraquinone, as heretofore obtained, dyes materials of cellulose acetate or other organic derivatives of cellulose in comparatively dull reddish-blue shades which are lacking in fastness to light and acquire a more pronounced reddish hue when viewed under artificial light. The dyestuff has hitherto been obtained by the nitration of anthraquinone to a mixture of 1,5- and 1,8-dinitro-anthraquinone, reduction of the nitro groups to form the corresponding diamino compounds, acetylation to protect the free amino groups, followed by further nitration, reduction and hydrolysis to yield the desired 1,4,5,8-tetra-amino-anthraquinone. The undesirable characteristics of the dyestuff prepared in this manner appear to be due to incomplete nitration of the acetylated mixed 1,5- and 1,8-diamino-anthraquinones with the result that the final product contains an appreciable quantity of triamino-anthraquinones.

It is an object of this invention to provide an improved process for the production of a novel navy blue anthraquinone dyestuff of satisfactory color and dyeing properties in increased yield which is relatively free from triamino anthraquinones.

Another object of this invention is to provide a process for the production of a novel anthraquinone dyestuff which is capable of yielding dyeings on cellulose organic derivative materials such as cellulose acetate in blue shades of excellent affinity, light-fastness and improved resistance to gas fading and which do not possess an undesirable change in shade under artificial light.

I have now found that a dyestuff having these improved properties and relatively free of triamino compounds may be prepared by effecting the nitration in the presence of boric acid and a substantial excess of sulfuric acid. The excess of sulfuric acid tends to inhibit the precipitation of the dinitro-diacetylamino-anthraquinones formed, which precipitate would normally occlude incompletely nitrated materials. Nitration may therefore proceed to completion and the final product will be relatively free of triamino-anthraquinones. During nitration some of the acetylene groups may be oxidized to hydroxy groups and in the absence of boric acid nitration will occur ortho to any hydroxy groups formed. Upon subsequent reduction the ortho compounds will be lost in the filtrate from the reduction mixture. When boric acid is present nitration will occur in the para position to any hydroxy groups formed increasing the total yield of dye. Since the hydroxy amino compounds produce dyeings having a reddish-blue shade it is necessary to partially methylate the dye to eliminate the reddish hue.

In accordance with my novel process from about 15 to 25 parts by weight of boric acid are dissolved in from about 500 to 600 parts by weight of concentrated (98–99%) sulfuric acid. The temperature of the solution is adjusted to about 20° C. or lower and from about 95 to 105 parts by weight of the acetylated mixed 1,5- and 1,8-diamino-anthraquinone are added gradually without allowing the temperature to exceed about 20° C. The solution is cooled to between about 0° C. and 5° C. and from about 118 to 225 parts by weight of a mixture of 60% sulfuric acid and 40% nitric acid containing from about 0.57 to 0.90 part by weight of nitric acid on the weight of the intermediate are added slowly over about a two hour period and stirring is contained at the same temperature for between about 3 to 4 hours. The nitration melt is drowned in a mixture of ice and water and the precipitated dinitro acetylated mixture of 1,5- and 1,8-diamino anthraquinone is then filtered and washed free of acid.

Reduction of the dinitro compound is carried on in aqueous suspension employing sodium sulfide as the reducing agent. The aqueous suspension of the dinitro compound is prepared and from about 265 to 275 parts by weight of sodium sulfide added slowly thereto with stirring while maintaining the temperature at about 20° C. or lower. The temperature is raised to about 75–80° C. and held at this point with stirring for about 2 hours to complete reduction of the nitro groups to amino groups. The reduction product is filtered and washed with water to remove soluble impurities and dried.

The hydrolysis or deacetylation of the dried product and its methylation, if desired, may be carried out simultaneously by dissolving about 80 parts by weight of the dried product in from about 400 to 450 parts by weight of concentrated (98%) sulfuric acid. After cooling to about 10° C., from about 35 to 45 parts by weight of methyl alcohol are added slowly and the reaction melt heated to about 130–135° C. for about four hours. The shade of the dyestuff may be examined at this point by a test dyeing and if the dye exhibits any undesirable reddish hue more methyl alcohol is added and methylation continued until the desired shade is obtained.

When a satisfactory shade has been obtained the acid melt is drowned in ice, the excess acid is neutralized with caustic and the dyestuff filtered and washed.

In order further to illustrate my invention, but without being limited thereto, the following example is given:

*Example*

238 parts by weight of diamino anthraquinone, a mixture of 1,5- and 1,8-diamino anthraquinones which may be prepared in conventional manner by the nitration of anthraquinone and reduction of the dinitro derivatives formed, are added to a mixture of 238 parts by weight of acetic acid and 238 parts by weight of acetic anhydride. The temperature is raised to 100 to 105° C. and held in this range for four hours with stirring. The hot reaction melt is drowned in 4000 parts of ice and water and the precipitated diacetylamino-anthraquinone is filtered, washed with a small amount of cold water and dried. The yield is 312 parts by weight or 97% of theoretical. Boric acid in amount of 62 parts by weight is dissolved in 1872 parts of concentrated (98–99%) sulfuric acid by warming to about 50–60° C. with stirring. The temperature of this solution is reduced to about 20° C. or lower and 312 parts by weight of diacetylamino-anthraquinone are added gradually without allowing the temperature to rise above about 20° C. The solution is cooled to between about 0–5° C. and 368 parts by weight of mixed acid, containing 219 parts by weight or 60% of sulfuric acid and 149 parts by weight or 40% of nitric acid are added over a period of two hours and stirring continued for three to four hours at the same temperature. The nitration melt is drowned in 5500 parts by weight of ice and water, filtered, and most of the acid washed out of the press cake with water.

The wet press cake of dinitro-diacetylamino-anthraquinone is slurried in 5600 parts by weight of cold water and any residual acid is neutralized with caustic. The temperature is adjusted to about 20° C. or lower, and 860 parts by weight of sodium sulfide (60% flake) added slowly with stirring. The temperature is then raised to about 75–80° C. and held at this point for two hours with stirring. After cooling to about 50–60° C. the product is filtered and washed thoroughly with water to remove all sodium sulfide and water soluble impurities, and dried. The yield is from 235 to 255 parts by weight at this point. The dry reduction product is dissolved in 1250 parts by weight of concentrated (98%) of sulfuric acid. After cooling to about 10° C., 137 parts of methyl alcohol by weight are added slowly after which the reaction melt is heated to about 130–135° C. for four hours. The dyestuff may be examined for shade at this point by making a test dyeing. A sample is isolated by drowning in ice, neutralizing the acid with caustic, filtering the dyestuff, washing well with water and drying. The test fabric is dyed and if the dyed fabric exhibits an unsatisfactory change under artificial light more methyl alcohol is added and methylation continued until a test shade is satisfactory.

Generally when the reaction conditions specified are used, the amount of methyl alcohol originally added will be sufficient to yield a dyestuff which will produce a dyed fabric showing a neutral change in shade under artificial light. The hot sulfuric acid melt is drowned in 12,500 parts by weight of ice and all the acid neutralized with caustic. The dyestuff is filtered, thoroughly washed with water to remove all salt resulting from the neutralization of the sulfuric acid and dried. The yield is 217 to 221 parts by weight which is 83.7 to 85.4% calculated on the basis of the diacetylamino-anthraquinone used, assuming the final product to be tetra-amino anthraquinone, although the precise formula and molecular weight of the final product are not known. The dyestuff has a satisfactory affinity for and dyes cellulose acetate and other organic derivative of cellulose in the form of textiles, for example, a blue shade of good light-fastness, which is resistant to gas fading and has a neutral change in shade when viewed under artificial light.

It is to be understood that the foregoing detailed description is given merely by way of illustration and that many variations may be made therein without departing from the spirit of my invention.

Having described my invention, what I desire to secure by Letters Patent is:

1. In a process for the production of an anthraquinone dyestuff wherein a mixture of acetylated 1,5- and 1,8-diamino-anthraquinone are nitrated, the step which comprises effecting the nitration of the mixed acetylated 1,5- and 1,8-diamino anthraquinones in the presence of boric acid and a substantial excess of concentrated sulfuric acid based on the weight of the anthraquinone compounds.

2. In a process for the production of an anthraquinone dyestuff wherein a mixture of acetylated 1,5- and 1,8-diamino-anthraquinone are nitrated, the step which comprises effecting the nitration of the mixed acetylated 1,5- and 1,8-diamino-anthraquinones at a temperature of about 0–5° C. in the presence of boric acid and a substantial excess of concentrated sulfuric acid based on the weight of the anthraquinone compounds.

3. In a process for the production of an anthraquinone dyestuff wherein a mixture of acetylated 1,5- and 1,8-diamino-anthraquinones are nitrated, the step which comprises effecting the nitration of each part by weight of the mixed acetylated 1,5- and 1,8-diamino-anthraquinones at a temperature of about 0–5° C. in the presence of from about 0.15 to 0.25 part by weight of boric acid and from about 5 to 6 parts by weight of concentrated sulfuric acid.

4. In a process for the production of an anthraquinone dyestuff wherein a mixture of acetylated 1,5- and 1,8-diamino-anthraquinones are nitrated, the step which comprises effecting the nitration of each part by weight of the mixed acetylated 1,5- and 1,8-diamino-anthraquinones at a temperature of about 5° C. in the presence of 0.2 part by weight of boric acid and 6 parts by weight of concentrated sulfuric acid.

5. The process for producing an anthraquinone dyestuff which comprises nitrating a mixture of acetylated 1,5- and 1,8-diamino-anthraquinones in the presence of boric acid and a substantial excess of concentrated sulfuric acid based on the weight of the anthraquinone compounds, reducing the added nitro groups of the mixture of nitro-acetylated 1,5- and 1,8-diamino-anthraquinones to amino groups, hydrolyzing the acetylamino groups to free amino groups and partially methylating the mixture.

6. The process of producing an anthraquinone dyestuff which comprises nitrating a mixture of acetylated 1,5- and 1,8-diamino-anthraquinones in the presence of boric acid and a substantial excess of concentrated sulfuric acid based on the weight of the anthraquinone compounds, reducing the added nitro groups of the mixture of nitro-acetylated 1,5- and 1,8-diamino-anthraquinones to amino groups with sodium sulfide, hydrolyzing the acetylamino groups to free amino groups with sulfuric acid and partially methylating the mixture.

7. The process for producing an anthraquinone dyestuff which comprises nitrating each part by weight of a mixture of acetylated 1,5- and 1,8-diamino-anthraquinones at a temperature of from about 0–5° C. in the presence of from about 0.15 to 0.25 part by weight of boric acid and from about 5 to 6 parts by weight of concentrated sulfuric acid, reducing the added nitro groups to amino groups with sodium sulfide, hydrolyzing the acetylamino groups to free amino groups with sulfuric acid and partially methylating the resultant mixture.

8. The process of producing an anthraquinone dyestuff which comprises nitrating each part by weight of a mixture of acetylated 1,5- and 1,8-diamino-anthraquinones at a temperature of from about 0–5° C. in the presence of from about 0.15 to 0.25 part by weight of boric acid and from about 5 to 6 parts by weight of concentrated sulfuric acid, reducing the added nitro groups to amino groups with sodium sulfide at a temperature of from about 75–80° C. and simultaneously hydrolyzing and partially methylating the reduced mixture with sulfuric acid and methyl alcohol at a temperature of from about 130–135° C.

CLARENCE E. HIESERMAN.

REFERENCES CITED

The following references are of record in the file of this patent:

UNITED STATES PATENTS

| Number | Name | Date |
|---|---|---|
| 1,970,669 | Nawiasky et al. | Aug. 21, 1934 |
| 2,309,708 | Olpin et al. | Feb. 2, 1943 |

FOREIGN PATENTS

| Number | Country | Date |
|---|---|---|
| 127,780 | Germany | Jan. 17, 1902 |
| 143,804 | Germany | July 27, 1903 |

OTHER REFERENCES

Houben, "Das Anthracen und die Anthrachione" (1929), pages 344 and 392.

Certificate of Correction

Patent No. 2,562,314　　　　　　　　　　　　　　　　　July 31, 1951

CLARENCE E. HIESERMAN

It is hereby certified that error appears in the printed specification of the above numbered patent requiring correction as follows:

Column 2, line 23, for "about 0.57" read *about 0.47*; line 26, for "contained" read *continued*;

and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*